United States Patent Office 2,714,572
Patented Aug. 2, 1955

2,714,572
METHOD OF FLY CONTROL AND SYNERGISTIC TOXICANT COMBINATION THEREFOR

James W. Hansen, Berkeley, Calif., assignor to California Spray-Chemical Corporation, Richmond, Calif., a corporation of Delaware No Drawing. Application April 2, 1952,
Serial No. 280,185

5 Claims. (Cl. 167—30)

This invention relates to insecticidal compositions and particularly to such compositions containing as an active toxic component the combination of the gamma isomer of hexachlorocyclohexane and 2-nitro-1,1-bis(p-chlorophenyl) alkane.

It has previously been recognized that hexachlorocyclohexane or the commonly designated benzene hexachloride (BHC) exists as a mixture of isomers and possesses exceptional insecticidal properties. Of the various isomers, the gamma isomer has been established as accounting for the predominant toxicant properties of the mixture. This toxic isomer is present in the isomeric mixture in varying amounts from about 6 to above 20% by weight, depending upon the method of preparation. Aside from its presence in benzene hexachloride or BHC, the gamma isomer has been extracted and separated as a substantially pure product and designated as Lindane. Lindane contains at least 99.5% of the gamma isomer of hexachlorocyclohexane by definition.

According to the present invention, it has been discovered that the toxicant properties of the gamma isomer of hexachlorocyclohexane may be materially enhanced by the presence of 2-nitro-1,1-bis(p-chlorophenyl) alkane, and particularly such compounds in which the alkane residue contains from 2 to 4 carbon atoms. This combination of toxicants has been found to be mutually active to provide a synergistic combination for application as the active toxic component in insecticidal compositions.

This synergistic toxicant combination may be formulated and applied in any of the conventional manners associated with the formulation and application of the gamma isomer of hexachlorocyclohexane. The toxicant combination may be formulated in conjunction with a liquid or solid carrier, or may be further combined with other toxic components to provide a combination insecticidal composition for multiple applications.

The pronounced advantage of the toxicant combination is particularly noticeable in its application as a fly control medium. It has become recognized in certain geographical areas and where the conditions are conducive to fly propagation that rapid fly evolution has developed a strain which is particularly resistant to conventional insecticidal control. In such areas, effective control requires greatly increased dosage of insecticide and constant application, and many dairy farmers have abandoned fly control in their barns as either impractical or impossible. However, by means of the subject toxicant combination, it is now possible to obtain effective fly control with a reduced concentration of the gamma isomer of hexachlorocyclohexane, even against resistant flies. Additionally, such control is effective over a greater length of time, due to the increased residual effect of the insecticide.

The synergistic compounds of the invention are the 2-nitro-1,1-bis(p-chlorophenyl) alkanes and particularly those containing from 2 to 4 carbon atoms in the alkane residue. Although certain of these compounds possess limited insecticidal properties, their application is restricted and does not approach the universal application of the gamma isomer of hexachlorocyclohexane. The mutual activation of these compounds is especially pronounced in the 2-nitro-1,1-bis(p-chlorophenyl) propane and 2-nitro-1,1-bis(p-chlorophenyl) butane as well as mixtures thereof.

The amount of each component in the toxicant combination does not appear to be critical and mutual activation may be obtained in widely varying ratios of each component. For maximum utilization of the synergistic effect of the nitrochlorophenyl alkane compound, it is desirable to employ a combination in which the ratio of the concentration of the gamma isomer of hexachlorocyclohexane to the nitrochlorophenyl alkane is at least one. Excellent results have been obtained in fly control with ratios varying between 0.2 and 10, and preferably in the range of 1:2.

As previously stated, the toxicant combination may be formulated and applied in any manner conventional to the use of insecticidal compositions containing lindane or the gamma isomer of hexachlorocyclohexane as an active toxic ingredient. One appreciable difference in this regard is the permissible reduction in gamma isomer dosage for equivalent or even greater toxicant effect. The toxicant combination may be either formulated together in a suitable concentrate or they may be separately formulated for subsequent joint application. Further, the synergist combination may be formulated for direct application to the organism or insect to be controlled such as in the form of aerosols, liquid sprays, and dusting compositions, or in a form suitable for indirect application such as fumigation or heat-induced vaporization in an enclosed area.

One of the advantages of lindane as an insecticide is its comparatively low vapor pressure which may be utilized for prolonged insect control in enclosed areas by heat-induced vaporization. Thus, the lindane may be contained in a receptacle to which heat is supplied in a controlled fashion such as by resistance wiring or may be coated on a heated surface such as an electric light bulb. The toxicant combination of the invention may be applied in a similar manner, although it is preferred to place each component in a separate receptacle and apply such heat to each as would be required to vaporize the components in the desired ratio or at least one gram per day for each 15,000 cu. ft. of area.

In order to illustrate the synergistic effect of the subject toxicant combination, the following data are presented. These test data were obtained in a procedure described by Hoskins & Caldwell in "Soap and Sanitary Chemicals," April 1947, page 43. The flies used in this test were a colony of resistant flies of the super-Pollard or Metcalf strain. In these tests the toxicant combination employed was lindane and a mixture of 2 parts of 2-nitro-1,1-bis(p-chlorophenyl) butane and one part of 2-nitro-1,1-bis(p-chlorophenyl) propane, which is designated in the following tabular results as "compound A." The compositions under test contained varying proportions of the subject toxicant combination in a carrier composed of 50% by volume of acetone and 50% by volume of kerosene.

| Concentration, Percent | | Percent Mortality, Resistant Flies | Percent Mortality (expected from Abbott's formula)* |
|---|---|---|---|
| Lindane | Compound A | | |
| 0.05 | -------- | 4.5 | ---------- |
| 0.2 | -------- | 29 | ---------- |
| -------- | 0.02 | 8 | ---------- |
| -------- | 0.05 | 30 | ---------- |
| 0.2 | 0.05 | 70.5 | 50.3 |
| 0.2 | 0.02 | 52.5 | 34.5 |
| 0.05 | 0.05 | 52.5 | 33 |

*Test of synergism as set forth in "Toxicity of Poisons Applied Jointly," by C. I. Bliss, "Annals of Applied Biology," vol. 26, No. 3, pp. 585-616, August 1939.

On the basis of the foregoing data, it was determined in the test employing 0.2% lindane and 0.05% compound A, that one pound of compound A replaces 12.8 pounds of lindane; and on the basis of the test employing 0.2% lindane and 0.02% compound A, one pound of compound A replaces 16 pounds of lindane. These data are presented merely for illustration, and equivalent results may be obtained with other specific toxicant combinations falling within the scope of the subject invention.

Obviously, many modifications and variations of the invention as hereinbefore set forth may be made without departing from the spirit and scope thereof, and only such limitations should be imposed as are indicated in the appended claims.

I claim:

1. An insecticidal composition comprising as an active component a synergistic combination of the gamma isomer of hexachlorocyclohexane and a combination of 2 parts of 2-nitro-1,1-bis(p-chlorophenyl) butane to one part of 2-nitro-1,1-bis(p-chlorophenyl) propane.

2. A method of fly control which comprises contacting said flies with a combination of the gamma isomer of hexachlorocyclohexane and a mixture of 2-nitro-1,1-bis-(p-chlorophenyl) alkanes containing from 2 to 4 carbon atoms in the alkane residue.

3. An insecticidal composition comprising as an active toxic component a synergistic combination of the gamma isomer of hexachlorocyclohexane and a mixture of 2-nitro-1,1-bis(p-chlorophenyl) alkanes containing from 2 to 4 carbon atoms in the alkane residue.

4. An insecticidal composition comprising as an active toxic component a combination of the gamma isomer of hexachlorocyclohexane and a mixture of 2-nitro-1,1-bis-(p-chlorophenyl) alkanes containing from 2 to 4 carbon atoms in the alkane residue, in which the ratio of the concentration of said gamma isomer to said mixture of nitro alkanes is between 0.2 and 10.

5. An insecticidal composition comprising as an active component a combination of the gamma isomer of hexachlorocyclohexane and a combination of 2 parts of 2-nitro-1,1-bis(p-chlorophenyl) butane to one part of 2-nitro-1,1-bis(p-chlorophenyl) propane, in which the ratio of the concentration of said gamma isomer to said combination of nitro alkanes is in the range of 0.2 to 10.

References Cited in the file of this patent

UNITED STATES PATENTS

| | | |
|---|---|---|
| 2,499,396 | Lynn | Mar. 7, 1950 |
| 2,538,595 | Sharp | Jan. 16, 1951 |

OTHER REFERENCES

Hass et al., Industrial & Engineering Chemistry, vol. 43, No. 12, Dec. 1951, pp. 2875 to 2878.

Brown, Insect Control by Chemicals, published by John Wiley & Sons, Inc., New York, 1951, pp. 600, 616.

Nature, vol. 167, Mar. 3, 1951, p. 368.

Agr. News Letter, Mar.–Apr. 1951, vol. 19, No. 2, pp. 23–24.

Journ. Econ. Ent., Aug. 1948, vol. 41, No. 4, pp. 548 to 554, 559.

Wadley, U. S. D. A. Agricultural Research Administration Bureau of Entomology and Plant Quarantine ET–223, June 1945.